United States Patent [19]

Dragone

[11] Patent Number: 4,904,042

[45] Date of Patent: Feb. 27, 1990

[54] N×N OPTICAL STAR COUPLER

[75] Inventor: Corrado Dragone, Little Silver, N.J.

[73] Assignees: American Telephone and Telegraph Company, New York, N.Y.; AT&T Bell Laboratories, Murray Hill, N.J.

[21] Appl. No.: 189,900

[22] Filed: May 3, 1988

[51] Int. Cl.⁴ .................................................. G02B 6/28
[52] U.S. Cl. ............................ 350/96.16; 350/96.11; 350/96.12
[58] Field of Search ............... 350/96.15, 96.16, 96.12, 350/96.11, 96.18

[56] References Cited

U.S. PATENT DOCUMENTS 4,474,425 10/1984 Kaede ................................. 350/96.16
4,786,131 11/1988 Mahapatra et al. ............... 350/96.16

OTHER PUBLICATIONS

*Optics Letters*, vol. 9, No. 8, Aug. 1984, "Hierarchic and Combinational Star Couplers", by M. E. Marhic, pp. 368–370.
*Electronics Letters*, vol. 16, No. 15, Jul. 1980, "Slab Waveguide Star Coupler for Multimode Optical Fibres", by K. Nosu and R. Watanabe, pp. 608–609.
*Electronic Letters*, vol. 22, No. 6, Mar. 13, 1986, "Low-Loss High-Silica Single-Mode Channel Waveguides", by N. Takato, M. Yasu, M. Kawachi, pp. 321–322.
*Electronics Letters*, vol. 17, No. 22, Oct. 29, 1981, "Low-Loss Multifibre Connectors With Plug-Guide-Grooved Silicon", by T. Satabe et al., pp. 828–830.

*Primary Examiner*—Frank Gonzalez
*Attorney, Agent, or Firm*—Samuel H. Dworetsky

[57] ABSTRACT

An efficient N×N star optical coupler suitable for mass production in integrated form is disclosed. The coupler can be realized using silicon technology to form a dielectric coupler slab and two arrays of strip waveguides all on a single glass substrate. Power transfer between the two arrays is accomplished through radiation in the dielectric slab with theoretical efficiency exceeding 30% under optimized conditions.

9 Claims, 2 Drawing Sheets

N×N OPTICAL STAR COUPLER

FIELD OF THE INVENTION

This invention relates to optical star couplers—devices for simultaneously transmitting optical signals from each of N sources to each of N' detectors—and to optical communication systems comprising such star couplers.

BACKGROUND OF THE INVENTION

A major consideration in the design of any communication system involves the requirement that any subscriber be able to communicate with any other subscriber in the system. The simplest way to satisfy this requirement is to interconnect every subscriber with every other subscriber using separate transmission lines. However, it is apparent that even in the smallest communications system this solution would involve an economically prohibitive number of interconnections. Accordingly, all commercial communication systems use sophisticated switching devices which enable any subscriber to be connected with any other subscriber, as required.

In communication systems which are based on the transmission and processing of information in the form of electrical signals, sophisticated switching systems are economically viable, even for small "local area" networks (LAN's). However, to date, the technology which has been developed for "switching" optical signals may be economically prohibitive for such small "local area" networks. Accordingly, much effort has been expended developing non-switched couplers which permit communication between any pair of subscribers in a local area optical network.

Two major designs have been suggested for such non-switched couplers in optical communication systems. The first is a "bus" system in which every subscriber signal is placed on a "bus" line which can be accessed at will by every other subscriber. In this manner any subscriber can communicate with any other subscriber. Various algorithms have been designed to increase the efficiency with which any subscriber can access the network and insert his information on the bus.

The second major coupler design is commonly called a "star coupler". In the star coupler every subscriber's output is directly transmitted to every other subscriber in the system. The star coupler divides the power entering any of its input ports equally among its output ports. Different messages can be communicated among the various subscribers by using wavelength, or time division multiplexing.

A simple 2×2 star coupler is the well known 3 db coupler—two fibers which share their optical power at a point of proximity. Such structures have been built by etching, grinding and polishing, or fusion techniques. Such 2×2 stars can be "ganged" to yield larger n×n stars, where n is any arbitrary power of two. (See, for example, M. E. Marhic, Hierarchic and Combinational Star Couplers, *Optics Letters,* Volume 9, Number 8, pages 369–370 (August 1984)). When multimode waveguides are used, the star coupler may be a glass element with each subscriber's output connected on one side of the element, and each subscriber's access line connected to the other side of the element (see, for example, K. Nosu and R. Watinobe, Slab Waveguide Star Coupler for Multimode Optical Fibers, *Electronics Letters,* Volume 16, Number 15, pages 608–609 (July 1980)).

A major disadvantage of the star coupler system is associated with the fact that each subscriber's signal must be distributed among all of the other subscribers, whether or not they desire to access the first subscriber's signal. Accordingly, power considerations loom large, since the power of each input is divided among all of the subscribers. When single mode waveguides are used the problem of power loss becomes even more significant, since the design of single mode star couplers is a much more demanding problem. Suggested single mode star couplers involve large numbers of "ganged", "stacked" or "cascaded" directional couplers. However, such couplers are extremely difficult to fabricate and economically prohibitive.

SUMMARY OF THE INVENTION

This invention is a highly efficient star coupler for use with single mode waveguides. In the inventive coupler the input and output waveguides are arranged in circular, input and output arrays. The center of curvature of the circle segment which defines the input array lies on the circle segment which defines the output array, and vice versa. The axes of the waveguides in each array are directed to the center of curvature of the circle defining the configuration of that array. The radius of the circles defining the configuration of each array is selected to maximize the transmission from the marginal input elements to the marginal output elements. The aperture of each of the elements may be further varied from element to element to maximize the efficiency of the array.

DETAILED DESCRIPTION

I. General Description Of The Invention

Figure 1:
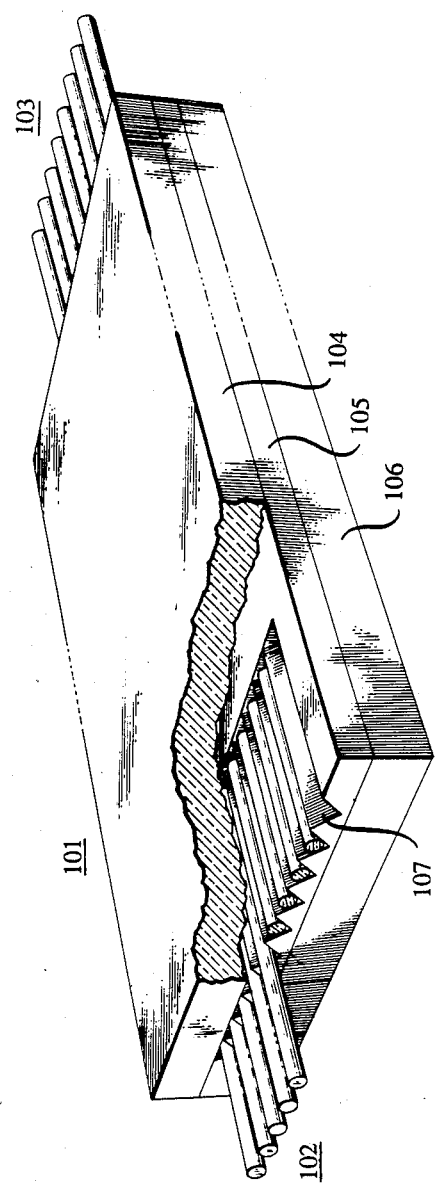
FIG. 1 is a schematic representation a prior art star coupler.

This invention involves star couplers which are used in optical communication systems to interconnect each subscriber to every other subscriber without the use of switching devices. Such couplers provide a permanent interconnection between all of the subscribers. A schematic representation of an exemplary prior art star coupler is shown in FIG. 1. In this Figure, 101 comprises a slab of dielectric material capable of transmitting light in the optical region of the electromagnetic spectrum. (In this application the term "optical" refers to electromagnetic wavelengths which can be transmitted in dielectric materials. Exemplary ranges of such wavelengths extend from 0.2 to 20 or 50 microns.) The various input waveguides, 102, may ultimately originate in each subscriber's transmitter. Output waveguides, 103, may ultimately lead to each subscriber's receiver.

In the prior art star coupler of FIG. 1, dielectric layers 104, 105 and 106 are usually designed to confine the optical radiation originating from waveguides 102 to the central layer 105 of the star coupler. Such designs may include, for example, the use of doped silica, with a dopant profile such that layer 105 has a higher index of refraction than layers 104 or 106. Exemplary dopants may include germania, fluorine, or phosphorus. Such use of dopant configurations to confine optical radiation within a dielectric material is well known in optical fiber technology. Waveguides 102 and 103 may comprise such doped optical fibers. The attachment and alignment of the optical fibers 102 and 103 within the star coupler 101, may be effected through the use of appropriately etched grooves, 107, as shown. Such "groove" techniques are well known in the fiber connector arts. (See, for example, T. Satake et al "Low-Loss Multifiber Connectors With Plug-Guide-Grooved Silicon" *Electronics Letters*, Volume 17, Number 22, Oct. 29, 1981).

It is apparent from FIG. 1 that power from each input element may be distributed among the various output elements, resulting in each subscriber's being connected continuously to every other subscriber. However, in the exemplary prior art device shown in FIG. 1, the waveguides are multimode waveguides, and in accordance with the characteristics of such waveguides, and those of the slab star coupler, the specific orientation of the waveguides has little affect on the efficiency of the coupler. However, for single mode waveguides the exact orientation of the waveguides does affect the transmission efficiency of the coupler, and since many of the envisioned optical communications systems involve single mode waveguides, the design of optical star couplers for use with single mode mode waveguides has become a topic of significant interest.

This invention is a star coupler for use with single mode waveguides. The inventive coupler is shown schematically in FIG. 2. The efficacy of the inventive design is derived mathematically in Section II below. However, in what follows, the results of that mathematical derivation are described heuristically.

Figure 2:
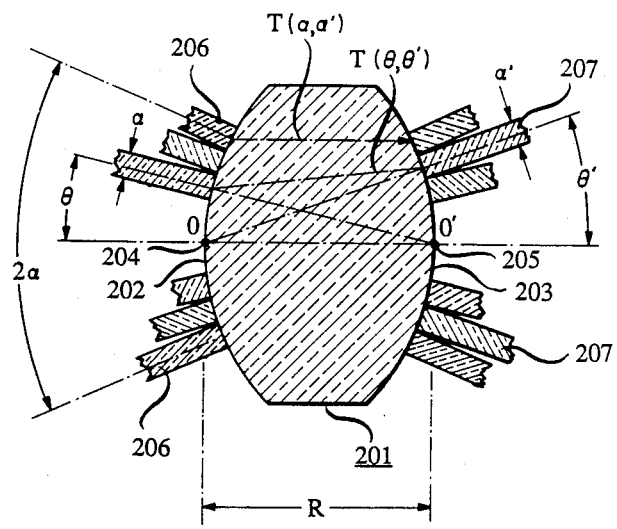
FIG. 2 is a simplified schematic representation of the inventive star coupler.

As shown in FIG. 2, the inventive star coupler, 201, is a slab of relatively low loss material, usually dielectric, capable of guiding optical power supplied by input waveguides 206, usually with loss less than 1 db/cm. The loss demand placed on the coupler may be much less restrictive than that placed on optical fibers because of the coupler's small size. The perimeter of the star coupler, 202 and 203 approximates segments of two circles, respectively. Each circular segment passes through the center of curvature of the circle associated with the other segment as shown at 204 and 205. So, for example, as shown in FIG. 2, segment 202 passes through point 204, which is the center of curvature of the circle associated with the other circular segment 203.

The input single mode waveguides, 206, form an array oriented along one of the circular segments, 202 and "inject" optical radiation into the coupler. In FIG. 2, "N" fibers are shown forming the array, of which six are shown. In a similar manner "N'" aperture elements, which are output single mode waveguides, form an array oriented along segment 203, are illuminated by the radiation passing through the coupler and "extract" optical radiation from the coupler. In accordance with a requirement of the inventive coupler, the axes of each of the waveguides of a given array are substantially directed toward the center of curvature of the circle associated with the segment about which those waveguides are oriented. So, for example, in FIG. 2, the waveguides, 206, which are oriented about segment 202, are oriented with their axes directed toward point 205, the center of curvature of the circle of which 202 is a segment. The waveguides and the coupler may be further constructed and oriented so that the optical radiation transmitted through the coupler is substantially restricted to, i.e. guided parallel to, a two dimensional plane, such as, for example, that defined by the arrays, and shown in FIG. 2. Techniques for forming, aligning, and interconnecting fibers are well known in the art and may be used to practice this invention.

The apertures of each of the input and output elements, respectively, may be equal, as shown. In FIG. 2 those aperture values are represented by "a" and "a'" respectively. In a particular embodiment, the waveguides may be butted against each other, as shown, and therefore the length "L" of the segment comprising the input array is given by L=N a and the length of the segment comprising the output array is given by L'=N'a'. The radii of the circles associated with the array segments are selected so that transmission from an input marginal element to an output marginal element, shown for example as $T(\alpha, \alpha)$, is maximized. As shown in Section II below this guarantees most efficient operation for equally apertured elements. Further improvement in efficiency can be obtained by then decreasing the waveguide apertures for those waveguides closer to the array centers, and increasing the aperture of those waveguides closer to the margins of their array, such that optical radiation injected into the coupler from a given "injection" waveguide is divided approximately equally among the "extraction" waveguides. Still further improvement in efficiency may be realized by increasing the width of the waveguides as they approach the coupler so as to render more continuous the transition from the waveguide to coupler.

Alternative embodiments of the invention may involve the use of free space as the coupler medium, the use of lenses to direct the optical radiation, and the use of three dimensional arrays comprising the inventive two-dimensional array.

Figure 3:
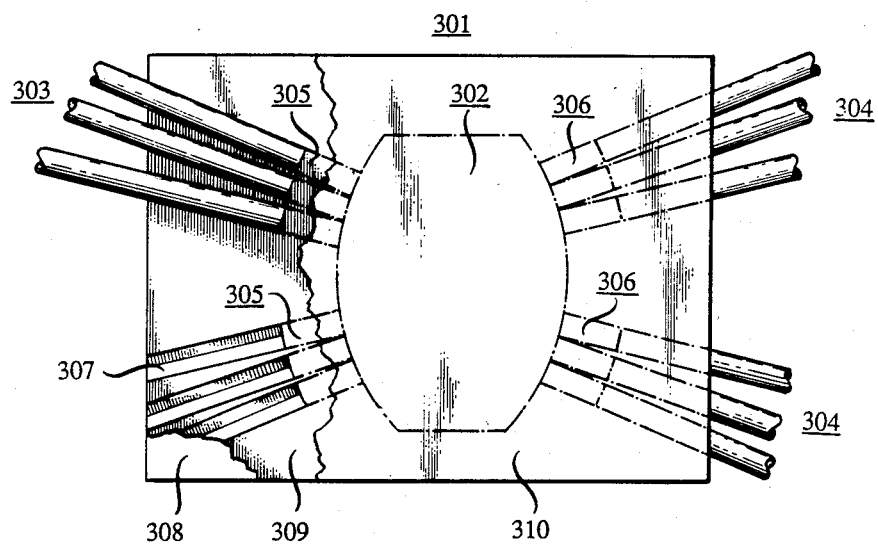
FIG. 3 is a schematic representation of a specific embodiment of the inventive star coupler.

A specific embodiment of the invention is shown in FIG. 3. In that Figure, 301 is a slab of material, perhaps dielectric, a portion of which, 302, comprises the inventive star coupler. In this embodiment, the input waveguides 303 and the output waveguides 304 are optical fibers. The coupler, 302, is designed so that the optical radiation entering the coupler is confined to a two-dimensional slab within the coupler defined by the axes of the input and output waveguides, as in the design of the prior art device shown in FIG. 1. Such confinement may be obtained by fabricating layers 308, 309 and 310 out of appropriately doped silica, with a dopant distribution designed to confine the radiation to the two-dimensional plane 309. Doped waveguiding regions 305 and 306 form the input and output waveguides to the star coupler. (See, for example, N. Takato et al "Low-Loss High-Silica Single-Mode Channel Waveguides" *Electronics Letters*, Volume 22, Number 6, Mar. 13, 1986). Optical fibers 303 and 304 are aligned with waveguides 305 and 306, using, for example, the groove technology described in the prior art. The resultant grooves are shown schematically at 307.

II. Detailed Mathematical Description Of The Inventive Device

1. Introduction

In this section we determine the efficiency of a N×N star coupler realized by using two arrays of nonoverlapping elements. We show that the highest efficiencies are obtained with planar geometry, i.e., radiation from either array is appropriately guided so that it propagates parallel to a plane, defined by the input and output waveguides. The coupler can be realized by using a planar arrangement comprising a dielectric slab and two linear arrays of elements, e.g., waveguides.

As shown in FIG. 2, power transfer between the input and output ports of the coupler takes place in a free space region defined by a slab waveguide between two arrays of waveguides. Power entering any of the waveguides excites the dominant mode $\psi$ of the waveguide and is radiated in the coupler region. This radiated power is in part intercepted by the receiving array aperture and, in part, it is lost because of spill-over. For a coupler optimized as shown here this spill-over loss is not large, since the angular aperture $2\alpha$ of the receiving array will be chosen large enough to intercept a fraction $\mu \simeq 60\%$ of the total radiated power. Notice, however, that the coupler efficiency $\gamma$ will be smaller than $\mu$, since the dominant mode of each receiving element will only accept a fraction $\eta$ of the incident power illuminating the element aperture. The problem, then, is to maximize the coupler efficiency $\gamma$, which will be defined here as the smallest value of $NT(\theta,\theta')$, where $T(\theta,\theta')$ denotes the power transmission matrix of the coupler, and $\theta,\theta'$ are the coordinates locating the elements of the arrays on left and right, respectively, of FIG. 2. We point out several important results of such an optimization: (A) the highest possible $\gamma$ using uniform arrays under the constraint (1) of Section 2 is $\gamma=0.34$; (B) the efficiency of such a coupler is approximately wavelength independent; (C) it is possible, by using arrays with nonuniform spacing between adjacent elements, to reduce the nonuniformity of $T(\theta,\theta')$, thus increasing $\gamma$, (D) the highest possible $\gamma$ obtainable with nonuniform arrays under the constraint (1) is 0.438; (E) this value can be further increased by removing the constraint (1). In the following section we outline a derivation of results (A,B). The coupler described here is the only known geometry that is efficiently realizable for large N in integrated form suitable for use with single-mode waveguides. It performs approximately a finite Fourier transformation and, therefore, it has numerous applications including scanning antennas. Our results contradict the common notion that power transfer between two arrays in free space is necessarily inefficient.

2. Power Transfer Between Two Linear Arrays

Assume that the two linear arrays in FIG. 2 consist of identical elements equispaced along two circles, each of which passes through the center of the other, so that the axis of any radiating element passes through the center of the receiving array. Let the dominant mode of each element on either circle be characterized by the distribution $\psi=\psi(u)$ with $u=2x/a$, where x denotes the distance from the center of the element aperture, and assume approximately $$\psi(u)=0, \text{ for } |u|>1, \qquad (1)$$

so that adjacent elements do not overlap. Power transfer from any element of either array to the other array is determined by the element radiation characteristics, which are specified by the Fourier transform $\Phi(w)$ of $\psi(u)$, $$\Phi(w) = \frac{1}{2}\int_{-1}^{1}\psi(u)e^{jwu}du, \qquad (2)$$

where w is determined by the angle $\theta'$ from the element axis, $$w = \frac{\pi a \sin\theta'}{\lambda}. \qquad (3)$$

The receiving array occupies the interval $|w|<w_\alpha$, where $$w_\alpha = \frac{\pi a \sin\alpha}{\lambda}, \qquad (4)$$

$2\alpha$ being the array angular aperture. Thus, ideally, one would like $$|\Phi| = A \text{ rect}\left(\frac{2w}{w_\alpha}\right), \qquad (5)$$

so that $|\Phi|$ is zero outside the above interval and, inside, it is a constant A. Then, all the power radiated by any element would be intercepted, without spillover, by the other array. Furthermore, one can show that the total power accepted by any receiving element would be equal to the total incident power over the interval corresponding to the receiving element width a. As a consequence $\mu=\eta=\gamma=1$ and the power transmission coefficient T between two elements of the two arrays would be exactly equal to 1/N. However, condition (5) is unrealizable because of assumption (1). Of importance, then, is the problem of maximizing $\gamma$. For a well behaved $\psi(u)$, one can show that $T(\theta,\theta')$ will attain its lowest value at the edges of the two arrays, i.e., $T(\theta,\theta') \geq T(\alpha,\alpha)$, and therefore $$\gamma = N\ T(\alpha,\alpha) = \frac{2}{\pi}\ w_\alpha\ |\Phi(w_\alpha)|^2, \qquad (6)$$

if $\psi(u)$ is normalized, $$\frac{1}{2}\int_{-1}^{1}|\psi|^2 du = 1. \qquad (7)$$

From the above relations one finds that $\gamma$ is maximized by choosing $$\psi = A \cos(W_\alpha u), \qquad (8)$$

with $w_\alpha \simeq 0.9$, resulting in $$T(\theta,\theta') \geq T(\alpha,\alpha) = \frac{0.34}{N}. \qquad (9)$$

An important property of such a coupler is that $\gamma$ will be unaffected by a small change in $\lambda$, as one can verify from Eq. (6) taking into account that $\gamma$ is stationary with respect to $w_\alpha$, for an optimized coupler. Furthermore, $\gamma$ will not be greatly affected if the above distribution $\psi$ characterized by $w_\alpha \simeq 0.9$ is replaced by a more realistic distribution realizable with the dominant mode of a strip waveguide. The geometry of FIG. 2 can be realized at optical frequencies by means of a dielectric slab, placed between the two circles, and two arrays of strip waveguides deposited on a glass substrate. One then obtains a structure suitable for mass production by conventional silicon technology, and efficiencies exceeding 30% should be obtainable under the constraint (1). Without this constraint, substantially higher efficiencies are possible.

I claim:

1. A device for simultaneously transmitting optical signals representative of intelligence from N sources to N' detectors, comprising
   (a) a medium capable of transmitting optical radiation with loss less than 1 db/cm;
   (b) an array of N injection means of aperture $a_i$, for injecting, into a substantially two dimensional plane within the said medium, optical radiation; and
   (c) an array of N' extraction means of aperture $a'_i$, for extracting transmitted optical radiation from the said medium; the invention characterized in that
   (1) the injection and extraction means comprise single mode waveguides;
   (2) the array of N injection means are located along a segment of a circle with radius of curvature substantially equal to R, the length, L, of the segment given substantially by $L = \Sigma a$;
   (3) the array of N' extraction means are located along a segment of a circle of radius of curvature substantially equal to R, the length, L', of the segment given substantially by $L' = \Sigma a'$;
   (4) the center of curvature of the circle whose segment determines the configuration of each array lies substantially on the circle segment which defines the other array;
   (5) the axis of symmetry of each of the elements is substantially directed to the center of curvature of the circle whose segment defines that array; and
   (6) the distance R is selected to substantially maximize the transmission between marginal injection elements and marginal extraction elements.

2. The device of claim 1 wherein the medium comprises silica.

3. The device of claim 2 wherein the medium comprises doped silica.

4. The device of claim 3 wherein the injection and extraction elements comprise doped waveguide regions.

5. The device of claim 4 further comprising means for aligning optical fibers with the doped waveguide regions such that the axis of symmetry of each doped waveguide region substantially coincides with an axis of symmetry of an optical fiber.

6. The device of claim 5 wherein the alignment means comprise grooves.

7. The device of claim 6 wherein the apertures of the individual elements are selected to substantially equalize transmission to each of the elements.

8. The device of claim 6 wherein the width of the doped waveguide regions increases as the waveguiding portion approaches the medium.

9. The device of claims 1 or 4 wherein the array of injection and extraction means is three dimensional.

* * * * *